United States Patent
Steigert

(10) Patent No.: US 6,843,821 B2
(45) Date of Patent: Jan. 18, 2005

(54) FILTERING CANDLES COMPRISING A SINTERED FILTERING TUBE

(75) Inventor: Simon Steigert, Radevormwald (DE)

(73) Assignee: GKN Sinter Metals GmbH (DE)

( * ) Notice: Subject to any disclaimer, the term of this patent is extended or adjusted under 35 U.S.C. 154(b) by 0 days.

(21) Appl. No.: 10/465,344

(22) Filed: Jun. 19, 2003

(65) Prior Publication Data
US 2004/0006956 A1 Jan. 15, 2004

Related U.S. Application Data

(63) Continuation of application No. PCT/EP01/14664, filed on Dec. 13, 2001.

(51) Int. Cl.[7] .............................................. B01D 46/24
(52) U.S. Cl. .............................. 55/523; 55/492; 55/508; 55/DIG. 5; 264/603; 264/628; 264/671; 264/125; 264/DIG. 48; 419/8; 419/10; 419/24; 419/42; 419/68
(58) Field of Search .................... 55/490, 492, 568, 55/523, DIG. 5; 419/1, 8, 10, 24, 42, 68; 264/603, 628, 632, 671, 125, DIG. 48; 261/125, DIG. 48

(56) References Cited

U.S. PATENT DOCUMENTS

| | | | | |
|---|---|---|---|---|
| 4,979,969 A | * | 12/1990 | Herding | 55/523 |
| 5,059,227 A | * | 10/1991 | Kilicaslan et al. | 55/523 |
| 5,223,138 A | * | 6/1993 | Zievers et al. | 55/DIG. 5 |
| 5,350,181 A | * | 9/1994 | Horve | 277/559 |
| 5,401,406 A | * | 3/1995 | Johnson et al. | 55/523 |
| 5,409,514 A | * | 4/1995 | Ragusa et al. | 55/523 |
| 5,564,755 A | * | 10/1996 | Ackermann et al. | 55/523 |
| 6,183,530 B1 | * | 2/2001 | Herding et al. | 55/523 |
| 6,331,197 B1 | * | 12/2001 | Herding et al. | 55/523 |
| 6,394,281 B2 | * | 5/2002 | Ritland et al. | 55/523 |

FOREIGN PATENT DOCUMENTS

| | | |
|---|---|---|
| DE | 39 15 845 A1 | 12/1989 |
| DE | 90 02 547.4 | 8/1991 |
| DE | 42 32 891 A1 | 4/1993 |
| DE | 199 24 675 A1 | 11/2000 |
| EP | 0 819 459 A1 | 1/1998 |
| WO | WO 00/72943 A1 | 12/2000 |

* cited by examiner

Primary Examiner—Duane Smith
Assistant Examiner—Jason M. Greene
(74) Attorney, Agent, or Firm—Woodcock Washburn LLP

(57) ABSTRACT

The aim of the invention is to provide filtering candles (1) comprising a sintered filtering tube (2) and a collar (3) which is connected thereto, and having an increased shelf life and improved resistance values. To this end, the collar (3) comprises an annular collar wall (4) which oriented towards the filtering tube (2) from the neck. Said wall comprises at least one recess (8) which is arranged in a perpendicular manner and at an angle in relation to a plane which is perpendicular to the axis of the filtering tube.

15 Claims, 3 Drawing Sheets

FILTERING CANDLES COMPRISING A SINTERED FILTERING TUBE

This application is a continuation of PCT/EP01/14664, filed Dec. 13, 2001.

FIELD OF THE INVENTION

This invention relates to a filtering candle, comprising a sintered filtering tube and a collar connected thereto, as well as to a method to manufacture it and its utilization.

BACKGROUND OF THE INVENTION

In order to fix sintered filtering tubes to/on something or install them, it is known in the art to provide the sintered filtering tube with a sintered or massive collar, i.e. made from cast iron or the like, which comprises fixing means to fix the filtering candle consisting of the sintered filtering tube and the collar to/on something. If a sintered collar is used, problems arise with respect to the strength of the fil-tering candle, in particular with respect to applications subjecting the filtering candle to heavy mechanical stress.

If filtering candles are used comprising a massive collar, fissures will occur, in particular in the connecting area of massive collar and sintered filtering tube when subjected to heavy mechanical or thermal stress, due to the different na-ture of the collar material and the filtering tube material as well as due to their different physical nature, which in the end cause total damage to the filtering candle, thus heavily reducing the shelf life of such filtering candles.

In particular, today it is still not possible to produce a secure and stable connection between a collar and a sintered filtering tube, if the filtering tube is made from sinterable powder material, which comprises mean diameter exceeding 200 μm, or if the filtering tube is made from sinterable fi-brous material.

SUMMARY OF THE INVENTION

It is the object of this invention to make available a fil-tering candle comprising a collar and a sintered filtering tube, which meets the requirements it is put to, particularly with respect to thermal and/or mechanical stress resistance.

This problem is solved according to the invention by means of a filtering candle, comprising a sintered filtering tube and a collar, which is connected to the filtering tube and com-prises an annular collar wall, which is oriented towards the filtering tube and starts from a neck and comprises at least one recess arranged perpendicular and angular in relation to a plane arranged perpendicular to a filtering tube axis. It is no longer possible, due to the specific arrangement of the recess in the filtering candle according to the invention, to mechanically detach the collar from the sin-tered filtering tube. In addition, the surface of the collar is increased due to the recess, whereby a higher number of points of contact is made available to sinterable material, regardless of whether it is in powder form or fibrous. Thus, the bonding strength between collar and sintered filtering tube is finally increased.

It is an advantage that the filtering candle according to the invention comprises at least one recess, which is formed as elongated borehole and/or elongated hole and/or long grove. This further increases the surface and thus, in the end, the bonding strength between collar and sintered filtering tube.

It is particularly preferred that the recess is arranged starting from the end of the collar wall opposite the neck. In a recess of such a shape, the surface of the collar, which is in contact with sinterable material, which is used to manu-facture the sintered filtering tube, is increased to the maxi-mum. In addition, it is an advantage that the recess is oriented towards the filtering tube, thus making it possible to easily and completely fill up the recess with sinterable material. Additional recesses, also in the form of boreholes, starting from the neck of the collar and oriented towards the filtering tube, can of course also be provided for, where re-quired in addition to the aforementioned oriented recess.

It is particularly preferred that the collar comprises at least two oppositely-arranged recesses. It is an advantage, however, if more than two oppositely-arranged recesses are provided. Due to the opposite arrangement of the recesses, the collar can neither be rotated out of nor pulled off the sintered filtering tube. The bonding strengths effective be-tween the sintered filtering tube and the collar are at their maximum in such an arrangement of the recesses. Between the oppositely-arranged recesses finger-shaped areas are formed in the collar wall. In this particularly preferred embodiment of the invention it is not possible to mechani-cally detach the collar from the sintered filtering tube. By adapting the geometry of the recesses, particularly their length, width and arrangement, particularly their angular arrangement, the filtering candle can best possibly be devel-oped and adjusted with regard to the planned application of the filtering can-dle according to the invention and the forces impacting on it on this occasion.

In a preferred embodiment, the collar wall comprises at its outer side and/or inner side at least one groove running around the circumference of the collar wall. The recesses and the groove in their combination achieve a further improvement of the connection between the collar and the sintered filter-ing tube. It is in particular an advantage that this also prevents the filtering tube from slipping off the collar it is connected to. The collar wall preferably com-prises further boreholes, particularly round ones.

It is an advantage that the neck is provided with at least one fixing means to fix the filtering candle according to the invention to/on something, by means of which the filtering candle according to the invention can be inserted into the appropriate equipment.

It is preferred that the sintered filtering tube of the fil-tering candle according to the invention is made from powdery and/or fibrous material. It is an advantage that the powdery material has a mean particle diameter of at least 200 μm. If fibrous material is used to manufacture the sintered filter-ing tube, it is preferred that it has a mean length of at least 1 mm and a mean diameter of at least 40 μm. With respect to the filtering candle in question according to the inven-tion, it is for the first time possible, if the aforemen-tioned materials are used, to make available fil-tering can-dles having a sufficient shelf life also when subjected to high mechanical and/or thermal stress. In con-trast to conven-tional state-of-the-art filtering candles, it is an advantage that the filtering candle according to the invention shows sufficient strength properties with respect to the connection between collar and sintered filtering tube, if in particular coarse-powdery or fibrous sinterable material is used, which is used—depending on the intended purpose of the filtering candle—to manufacture the sintered filtering tube.

Sinterable powders within the meaning of the invention mean powders manufactured from metal, metallic oxides, ceramics and/or plastics. Usable metallic powders according to this invention are not only powders from pure metal, but also pow-ders from metallic alloys and/or powder mixtures of different metals and metallic alloys. Among them are in particular steels, preferably chromium-nickel steels, bronzes, nickel-based alloys such as Hastalloy, Inconel or the like, whereby powder mixtures can also contain high-melting components, such as for example platinum or the like. The used metallic powder and its particle size depend on the particular purpose of use. Preferred powders are the alloys 316 L, 304 L, In-conel 600, Inconel 625 and Hastalloy B, X and C.

The sinterable powder can consist of powdery and/or spattered particles. Spattered sinterable powders make it in particular possible to obtain filtering tubes and/or collars of at the same time low density and high strength.

Fibrous sinterable materials for the manufacturing of the filtering tube and/or collar of the filtering candle accord-ing to the invention are in particular metal fibers obtained through extraction through melting. Particularly preferred in this context are metal fibers from an iron chromium alumi-num alloy or a nickel aluminum alloy. Metal fibers extracted through melting on the basis of an iron chromium aluminum al-loy having a chromium content in a range of about 10–25 weight per cent and aluminum in a range of about 5–20 weight per cent, in each case referred to the total quantity of the used metal fibers, are preferably used. Fibers with such a high aluminum ratio have a very good temperature stabil-ity in particular with respect to hot gas filtration. The iron chro-mium aluminum alloy can contain admixtures of tita-nium and/or zircon and/or hafnium and/or rare earth metals. Furthermore, metal fibers on the basis of a nickel aluminum alloy extracted through melting having an aluminum content in a range of about 10–40 weight per cent can be used, whereby admix-tures of tantalum and/or zircon and/or hafnium and/or boron and/or rare earth metals can be included.

A massive form of the collar is particularly preferred, that is, it has not been manufactured through a sintering process. In particular, cast iron and steel are preferably used. How-ever, the collar can also be produced from sinterable mate-rial, whereby metallic powders having a small particle size in a range of about $0.05\mu$ to $100\mu$ are preferably used.

Furthermore, the present invention relates to a collar as it is used in the filtering candle according to the invention.

Furthermore, the present invention relates to a method to manufacture the filtering candle according to the invention, whereby as a first step, a collar is placed into a die;
as a second step, the die is filled with sinterable mate-rial, until the collar wall is covered in the material;
as a third step, the material and the collar are pressed, and subsequently,
as a fourth step, the filtering candle blank thus obtained is sintered.

The pressing procedure is preferably isostatic. If sinter-able fibers are used as sinterable material, they are prefer-ably individualized when filling them into the die through impact of directed mechanical vibrations. The agitation of the heap of material through impact of directed mechanical vibrations can be caused, for exanple, by effecting the fiber supply from the fiber heap to the die via a vibrating conveyor. If the collar is made from sinterable material, the correspond-ing pre-pressed powder metallurgic green body is preferably placed into the die. When using such a collar it is an advan-tage that it needs no further post-processing as all neces-sary shapes of the die, for instance boreholes as fixing means, grooves, oppositely-arranged recesses and/or boreholes in the collar walls, can be shaped when manufac-turing the die. In particular, in this case no mechanical post-processing is necessary.

Finally, the present invention relates to the utilization of filtering candles in hot gas filtration, membrane reactors, as catalyst, as air filter and/or gas filter, as filter to filter liquids and/or for the separation and concentration of materials.

These and further advantages of the present invention are il-lustrated by means of the following drawings.

DETAILED DESCRIPTION OF THE INVENTION

Figure 1:
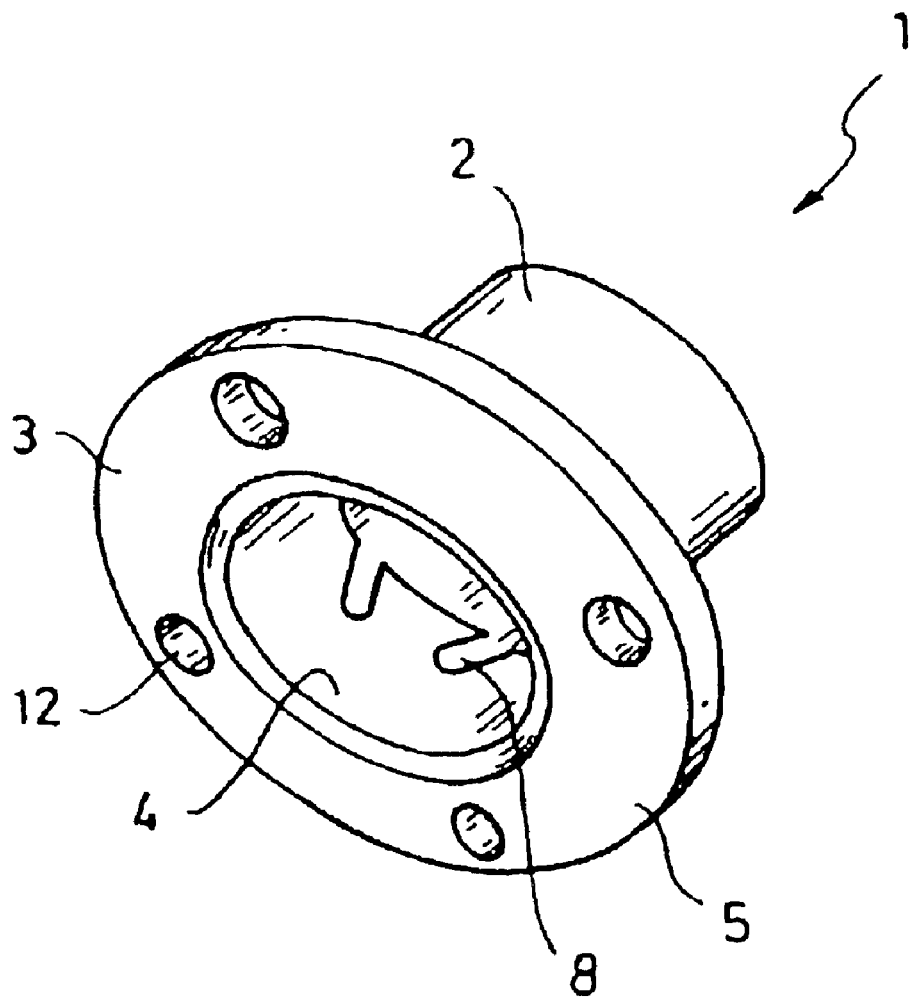
FIG. 1: Perspective view of a filtering candle according to the invention.

FIG. 1 shows a filtering candle according to the invention, the whole of which is referred to as 1, which consists of a sintered filtering tube 2 and a massive collar 3, made from gray cast iron. The collar 3 comprises a neck 5 with bore-holes 12 to fix the filtering candle 1 to equipment or the like. Furthermore, the collar 3 comprises a collar wall 4 with a recess 8. These recesses 8 are arranged opposite to one another and arranged starting from the end of the collar wall 4 opposite the neck 5 of the collar 3. They are formed as elongated boreholes.

Figure 2:
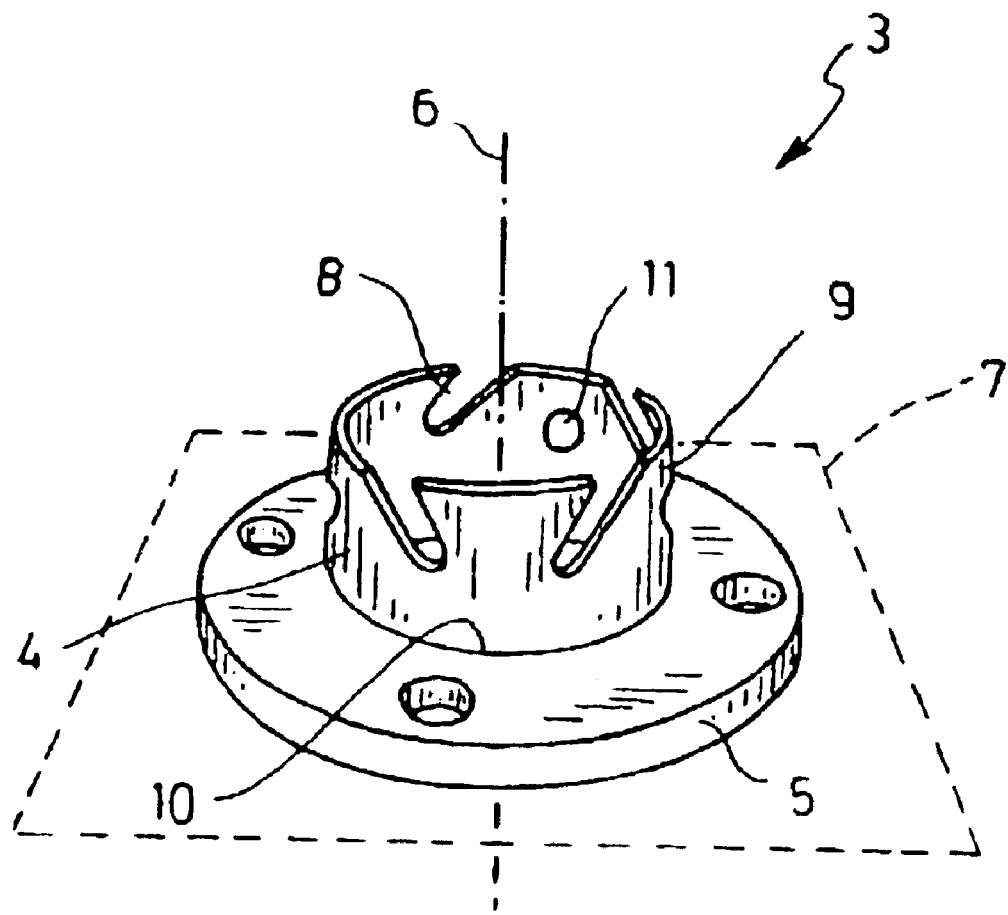
FIG. 2: Perspective top view of a collar according to the invention.

FIG. 2 shows an embodiment of the collar according to the in-vention, as it is also used in the filtering candle 1 accord-ing to FIG. 1. The collar, the whole of which is referred to as 3, comprises several recesses 8, which are arranged in op-posite direction to one another, and between these recesses 8 finger-shaped areas in the collar wall 4. The collar wall 4 further comprises at its outer side grooves 10 running around the circumference of the collar wall 4. In addition to the recesses 8, the collar wall 4 can also comprise boreholes 11. The recesses 8 are arranged perpendicular and angular in re-lation to a plane 7, which is perpendicular in relation to the filtering tube axis 6. The angle between the plane 7 and the recesses 8 can lie in a range of about 0° to 90°. How-ever, a range of about 10° to 80° is preferred, in particular of about 30° to 60°.

Figure 3:
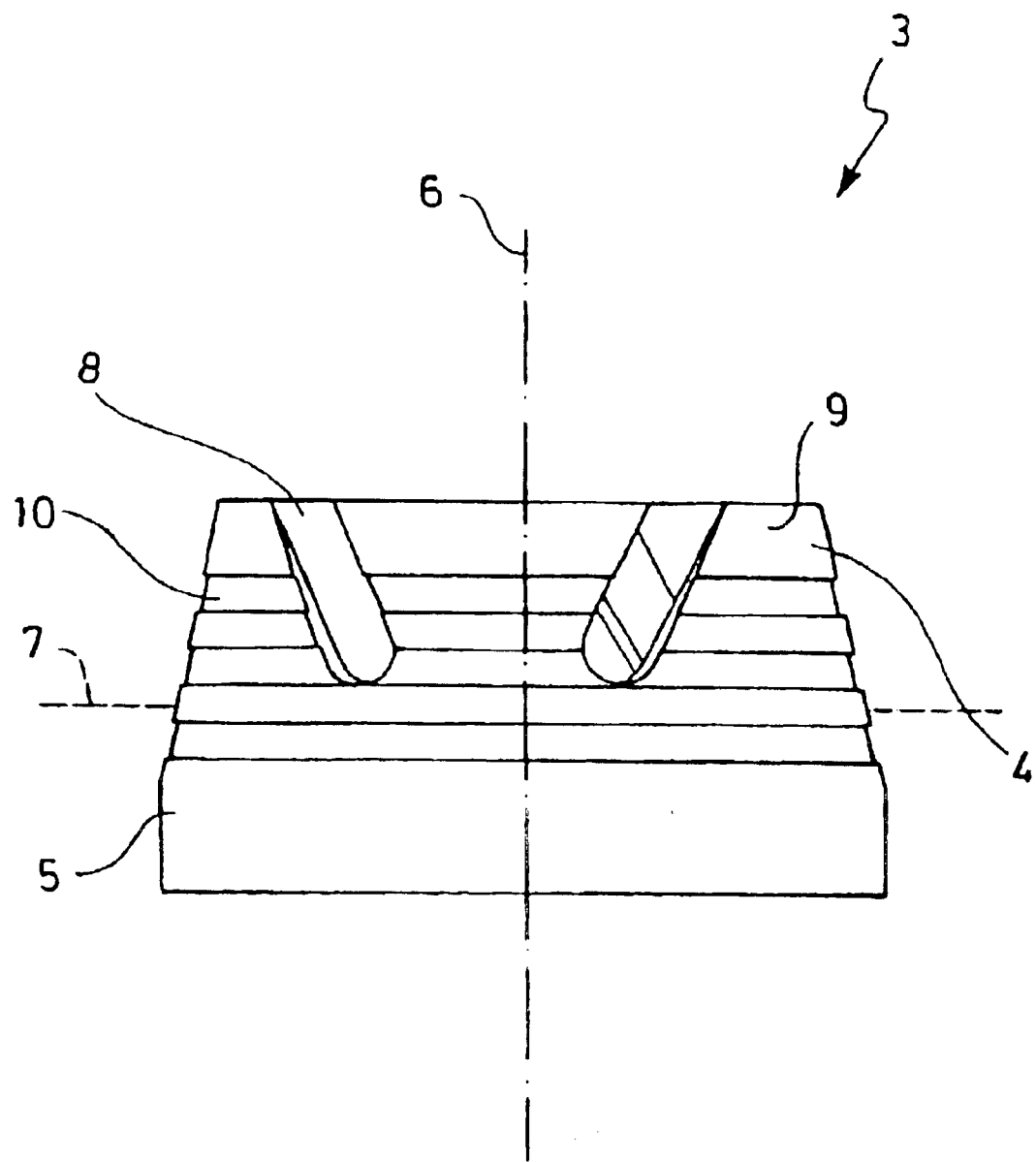
FIG. 3: Schematic top view of the collar according to the invention.

FIG. 3 shows a schematic illustration of the collar 3 accord-ing to the invention, thus illustrating further the proper-ties shown in FIG. 2. In particular, FIG. 3 clearly shows the grooves 10 running around the circumference of the collar wall 4. The neck 5 of the collar 3 is shown without fixing means for fixing the collar 3 to equipment.

Filtering candles comprising a sintered filtering tube, which is made from metallic short fibers from a nickel aluminum al-loy ($NI^3AL$; manufacturer: e.g. Hoeganaes Corp., USA) having a mean length in a range of about 4 to 8 mm and a diameter of about 80 $\mu$m, and a collar 3, made from corrosion-resistant steel in accordance with DIN stan-dard St 1.4571 by means of the method in accordance with the invention involving isostatic pressing at about 2,500 bar and subsequent sinter-ing under vacuum at about 1,220° C., were tested on a test fa-cility for hot gas filtration (semi industrial test station). In this test station temperatures up to 800° C. could be simu-lated. The used filtering candles were tested at 300° C., 500° C. and 800° C. Exhaust gas of an oil burner was used as medium to be filtered, to which various dusts and polluting gases could be added in doses. During the test the filtering candle was dedusted through blasts of compressed air from the inside to the outside at short time intervals. The air blast had an ex-cess pressure of 6 bar. The candles were fitted into the test facility in a hanging manner, whereby their weight amounted to 4.5 kg without collar.

Under the strains described above, no changes could be estab-lished in the connection area between the filtering candle and the collar during a time period of four weeks, even though the materials of the filtering tube 2 and the collar 3 had different and low thermal expansion coefficients.

The test described above was repeated using filtering candles with the filtering tube 2 being made from coarse high-grade steel powder having a mean diameter in a range of about 500 to 700 $\mu$m instead of being made from metal fibers. Here as well no changes in the connection area between filtering tube 2 and collar 3 could be established.

The filtering candle according to the invention as well as the collar according to the invention can in particular be utilized to their advantage, if coarse sinterable materials or fibrous sinterable materials are used. Beyond that, clearly improved properties as regards durability and stress resistance were achieved if materials, difficult to sinter, particularly also ceramics, were used. The filtering candles according to the invention withstood extremely high mechani-cal and thermal stress, even though the material of the col-lar and the filtering tube had different thermal expansion coefficients.

What is claimed is:

1. A filtering candle, comprising a sintered filtering tube and a collar fixedly coupled to the sintered filtering tube, wherein the collar comprises an annular collar wall oriented toward the sintered filtering tube and adjoining a neck of the collar, the collar wall having a recess formed therein, the recess extending in a direction that is oriented at an acute angle in relation to a first plane having a substantially perpendicular orientation in relation to a longitudinal axis of the sintered filtering tube, and the recess defining a second plane, the second plane being substantially perpendicular to the first plane.

2. The filtering candle of claim 1, wherein the recess is formed as one of an elongated borehole, an elongated hole, and an elongated groove.

3. The filtering candle of claim 1, wherein a first end of the wall adjoins the neck of the collar, and the recess extends from a second end of the collar.

4. The filtering candle of claim 1, wherein the collar wall has two of the recesses formed therein and the two of the recesses are diametrically opposed.

5. The filtering candle of claim 1, wherein the collar is formed by a process other than sintering.

6. The filtering candle of claim 1, wherein a circumferentially-extending groove is formed in at least one of an outer circumferential surface and an inner circumferential surface of the collar wall.

7. The filtering candle of claim 1, wherein the collar wall has a bore hole formed therein.

8. The filtering candle of claim 1, wherein the collar further comprises the neck, and the neck comprises means for fixing the filtering candle to a surface.

9. The filtering candle of claim 1, wherein the sintered filtering tube is formed from at least one of a powdered material and a fibrous material.

10. The filtering candle of claim 9, wherein the powdered material has a mean particle diameter of at least approximately 200 $\mu$m.

11. The filtering candle of claim 9, wherein the fibrous material has a mean fiber length of at least approximately 1 mm.

12. The filtering candle of claim 9, wherein the fibrous material has a mean fiber diameter of at least approximately 40 $\mu$m.

13. A method for manufacturing a filtering candle, comprising:

placing a collar in a die;

filling the die with a sinterable material until a wall of the collar is covered with the sinterable material and a recess formed in the wall and extending in a direction substantially non-parallel to a centerline of the wall is filled with the sinterable material;

pressing the sinterable material and the collar to form a filtering candle blank; and sintering the filtering candle blank.

14. The method of claim 13, wherein pressing the material and the collar to form a filtering candle blank comprises pressing the material and the collar on an isostatic basis.

15. A filtering candle, comprising:

a collar having a wall portion and a neck portion fixedly coupled to the wall portion, the wall portion having a recess formed therein, the recess extending in a direction substantially non-parallel to a centerline of the wall portion; and a sintered filtering tube, wherein a portion of the sintered filtering tube fills the recess so that the collar securely engages the sintered filtering tube by way of the recess.

* * * * *

UNITED STATES PATENT AND TRADEMARK OFFICE
CERTIFICATE OF CORRECTION

| | |
|---|---|
| PATENT NO. | : 6,843,821 B2 |
| APPLICATION NO. | : 10/465344 |
| DATED | : January 18, 2005 |
| INVENTOR(S) | : Simon Steigert |

Page 1 of 1

It is certified that error appears in the above-identified patent and that said Letters Patent is hereby corrected as shown below:

On the title page, item [30]
    Please add under "Related Foreign Data"

-- DE 100 63 462.1 filed December 19, 2000 --

Signed and Sealed this

Eighth Day of August, 2006

JON W. DUDAS
*Director of the United States Patent and Trademark Office*